US006910272B2

(12) United States Patent
Takahashi

(10) Patent No.: US 6,910,272 B2

(45) Date of Patent: Jun. 28, 2005

(54) METHOD OF MANUFACTURING AN INK JET RECORDING HEAD

(75) Inventor: Tetsushi Takahashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/745,678

(22) Filed: Dec. 29, 2003

(65) Prior Publication Data

US 2004/0134068 A1 Jul. 15, 2004

Related U.S. Application Data

(62) Division of application No. 10/073,367, filed on Feb. 13, 2002, now Pat. No. 6,692,114.

(30) Foreign Application Priority Data

Feb. 14, 2001 (JP) ...................................... P2001-37674

(51) Int. Cl.[7] ............................ B23P 17/00; B41J 2/045

(52) U.S. Cl. .......................... 29/890.1; 29/830; 29/831; 29/832; 347/68

(58) Field of Search ................................ 29/890.1, 830, 29/831, 832; 347/68, 58, 70, 63, 27, 44, 54, 55, 56; 438/21; 216/27

(56) References Cited

U.S. PATENT DOCUMENTS 5,510,819 A * 4/1996 Fujimoto et al. ............. 347/70
5,802,686 A * 9/1998 Shimada et al. ........... 29/25.35
5,933,167 A * 8/1999 Shimada et al. .............. 347/70
6,109,738 A * 8/2000 Miyata et al. ................ 347/71
6,183,070 B1 * 2/2001 Hashizume .................. 347/70

FOREIGN PATENT DOCUMENTS

| | | |
|---|---|---|
| JP | 01283153 A | 11/1989 |
| JP | 5-286131 | 2/1993 |
| JP | 10-286960 A | 10/1998 |
| JP | 2000-006395 | 1/2000 |
| JP | 2000-127382 A | 5/2000 |

* cited by examiner

*Primary Examiner*—Carl J. Arbes
*Assistant Examiner*—Tai Nguyen
(74) *Attorney, Agent, or Firm*—Sughrue Mion PLLC

(57) ABSTRACT

A method of forming an ink jet recording head having a passage forming substrate made of a silicon monocrystalline substrate, having pressure generating chambers communicating with nozzle orifices, and having piezoelectric elements. Grooves, extending in the longitudinal direction, are formed on both sides of a region where the pressure generating chamber is to be formed in a surface of the passage forming substrate. Etching stop layers are provided to restrict the etching of the passage forming substrate. Pressure generating chambers are formed by etching out at least a vibration plate side of the passage forming substrate by an etching process so that the etching stop layers are exposed. Piezoelectric elements are formed by successively laminating a lower electrode, piezoelectric layer, and an upper electrode on the passage forming substrate.

8 Claims, 6 Drawing Sheets

METHOD OF MANUFACTURING AN INK JET RECORDING HEAD

This application is a Divisional of U.S. application Ser. No. 10/073,367, filed Feb. 13, 2002 now is U.S. Pat. No. 6,692,114. The above noted prior application is hereby incorporated by reference.

BACKGROUND OF THE INVENTION

The present invention relates to an ink jet recording head in which a part of each pressure generating chamber communicating with nozzle orifices for ejecting ink droplets is formed with a vibration plate, a piezoelectric element is provided on the vibration plate interposed, and an ink droplet is ejected by a displacement of the piezoelectric element and a method of manufacturing the recording head, and an ink jet recording apparatus.

The ink jet recording head in which a part of each pressure generating chamber communicating with nozzle orifices for ejecting ink droplets is formed with a vibration plate, and the vibration plate by the piezoelectric element is deformed to pressurize ink in the pressure generating chamber to eject an ink droplet through the nozzle orifice, is known. This type of recording head is categorized into two types of recording heads; one uses the piezoelectric actuators of the longitudinal vibration mode in which the piezoelectric element axially expands and shrinks, and the other uses the piezoelectric actuators of the flexural vibration mode. Those types of recording heads have been put into practice.

The former recording head is advantageous in that the recording head suitable for the high density printing may be manufactured since the volume of the pressure generating chamber is varied by bringing the end face of the piezoelectric element into contact with the vibration plate. However, it has a difficult step of cutting the piezoelectric elements in a comb shape in alignment with the pitches of the nozzle orifice array, and needs another step of positioning and fixing the cut piezoelectric elements to the pressure generating chambers. In this respect, the manufacturing process is complex.

The latter recording head is advantageous in that the piezoelectric elements may be formed on the vibration plates in a relatively simple manner that a green sheet of piezoelectric material is bonded onto the vibration plates in conformity with a shape of the pressure generating chambers, and then baked. However, this recording head is disadvantageous in that since the flexural vibration is utilized, an area of some extent must be secured for each the piezoelectric element. Accordingly, it is difficult to array the piezoelectric elements at high density.

To solve the disadvantage of the latter recording head, there is proposed a technique in which a piezoelectric layer is uniformly formed over the entire surface of the vibration plate, and the piezoelectric layer is cut by a lithography process to form individual piezoelectric elements for each pressure generating chamber in accordance with arrangements of the pressure generating chambers (see JP-A-5-286131).

This technique enables to eliminate the work of bonding the piezoelectric elements to the vibration plates. Accordingly, the piezoelectric elements may be manufactured by a precise and simple process, using the lithography process. Additionally, the piezoelectric element is thinned and hence driven at high speed.

In such an ink jet recording head, the pressure generating chambers are formed penetrating the passage forming substrate in a manner that the passage forming substrate is selectively etched by anisotropic etching process from a surface of the passage forming substrate opposite to the piezoelectric-elements to the vibration plate.

When the anisotropic etching process is carried out in the form of a wet etching process using an alkaline aqueous solution, the alkaline aqueous solution or etching reaction products penetrate through the vibration plate to damage the piezoelectric elements, at the end of the etching process.

In the dry etching process, the etching is terminated indefinitely, therefore it is difficult to control the width of the vibration plate side of the pressure generating chamber. Accordingly, the pressure generating chambers cannot be formed with high accuracy by the dry etching process.

Further, in such an ink jet recording head, the pressure generating chambers are formed by the etching after the piezoelectric elements are formed. Accordingly, a position of the vibration plate side of the pressure generating chamber is instable by the dispersion in verticality of the pressure generating chambers. An accuracy of a relative position shift of the piezoelectric element to the pressure generating chambers is low, so that the ink ejecting characteristic and stability are low.

SUMMARY OF THE INVENTION

An object of the present invention is to provide an ink jet recording head having highly reliable piezoelectric elements and the improved ink ejecting characteristic and stability and a method of manufacturing the same, and an ink jet recording apparatus.

In one broad aspect of the invention, there is provided a first ink jet recording head having a passage forming substrate made of a silicon monocrystalline substrate including at least one pressure generating chamber communicating with a nozzle orifice; a vibration plate provided on a surface of the passage forming substrate; a piezoelectric element provided on the vibration plate having a lower electrode film, a piezoelectric layer and an upper electrode; a wide portion provided in the pressure generating chamber on a side of the vibration plate, extending in a longitudinal direction of the pressure generating chamber, a groove formed on a side of the wide portion, extending in a longitudinal direction of the wide portion; and an etching stop layer provided in the groove, defining a side wall of the wide portion as viewed in the width direction thereof to restrict the spread of the etching in the width direction.

In the first ink jet recording head, the width of the wide portion of the pressure generating chamber is restricted easily and reliably by the etching stop layer. As a result, the pressure generating chamber is manufactured highly accurately.

In a second ink jet recording head, the etching stop layer has each an insulating property.

In the second ink jet recording head, since the etching stop layer has an insulating property, no current leaks to the ink in the pressure generating chamber.

In a third ink jet recording head, the etching stop layer is made of the same material as that of a part of the vibration plate.

In the third ink jet recording head, the etching stop layer is made of the same material as that of a part of the vibration plate. Accordingly, the manufacturing process is simplified.

In a fourth ink jet recording head, the etching stop layer is made of silicon oxide.

In the fourth ink jet recording head, the etching stop layer is formed easily and reliably.

In a fifth ink jet recording head, the width of each groove is selected to be smaller in value than a value which is two times as large as the thickness of the etching stop layer.

In the fifth ink jet recording head, the etching stop layer is reliably formed within the groove.

In a sixth ink jet recording head, at least the vibration plate side of the pressure generating chambers are formed by anisotropic dry etching process.

In the sixth ink jet recording head, the piezoelectric element is reliably prevented from being damaged by an etching solution or etching reaction product, and the pressure generating chamber is manufactured highly accurately.

In another broad aspect, there is provided an ink jet recording apparatus being provided with the first to sixth ink jet recording head as described above.

The thus constructed ink jet recording apparatus is improved in the ink ejecting characteristics.

In yet another broad aspect, there is provided a method of manufacturing an ink jet recording head having a passage forming substrate consisting of a silicon monocrystalline substrate in which pressure generating chambers communicating with nozzle orifices are formed, and piezoelectric elements being formed on one of surfaces of the passage forming substrate with vibration plates interposed therebetween, each piezoelectric element including a lower electrode film, a piezoelectric layer and an upper electrode, which are formed with thin films formed by film forming and lithography processes. The method preferably comprises the steps of: forming grooves on both sides of each region at which the pressure generating chamber is to be formed in one of surfaces of the passage forming substrate, the grooves extending in the longitudinal direction; forming, in the grooves, etching stop layers which restrict the etching of the passage forming substrate; forming the piezoelectric elements by successively laminating the lower electrodes, the piezoelectric layers and the upper electrodes on one of the surfaces of the passage forming substrate with vibration plates being interposed therebetween, and by patterning the resultant structure; and forming the pressure generating chamber by etching out at least the vibration plate side of the passage forming substrate by the anisotropic dry etching process till the etching stop layers are exposed.

In the method of manufacturing the ink jet recording head, the spread of the etching in the width direction of the vibration plate side of the pressure generating chamber is easily controlled, so that the pressure generating chambers are manufactured highly accurately.

In another ink jet recording head manufacturing method, in the pressure generating chamber forming step, the passage forming substrate is subjected to anisotropic wet etching, and then anisotropic dry etching, thereby forming the pressure generating chambers.

In this method of manufacturing the ink jet recording head, the pressure generating chambers are formed by anisotropic wet etching and anisotropic dry etching. Accordingly, the time taken for etching may be reduced, and its manufacturing cost is reduced.

In yet another ink jet recording head manufacturing method, the etching stop layers have each an insulating property.

In the method of manufacturing the ink jet recording head, since the etching stop layers have each an insulating property, no current leaks to the ink in the pressure generating chambers.

In yet another ink jet recording head manufacturing method, the etching stop layers are made of the same material as that of a part of the vibration plate.

In the method of manufacturing the ink jet recording head, the etching stop layers are made of the same material as that of a part of the vibration plate. Accordingly, the manufacturing process is simplified.

In another ink jet recording head manufacturing method, the etching stop layers are made of silicon oxide.

In the method of manufacturing the ink jet recording head, the etching stop layers are formed easily and reliably.

In a further ink jet recording head manufacturing method, in the step of forming the grooves, the width of each groove is selected to be smaller in value than a value which is two times as large as the thickness of the etching stop layer.

In the method of manufacturing the ink jet recording head, the etching stop layers are reliably formed within the grooves.

BRIEF DESCRIPTION OF THE DRAWINGS

FIG. 1A is a cross sectional view showing a pressure generating chamber, the illustration being viewed in the longitudinal direction, and FIG. 2B is a cross sectional view showing taken on line A–A' in FIG. 2A;

DETAILED DESCRIPTION OF THE PREFERRED EMBODIMENTS

The preferred embodiments of the present invention will be described with reference to the accompanying drawings.

(Embodiment 1)

Figure 1:
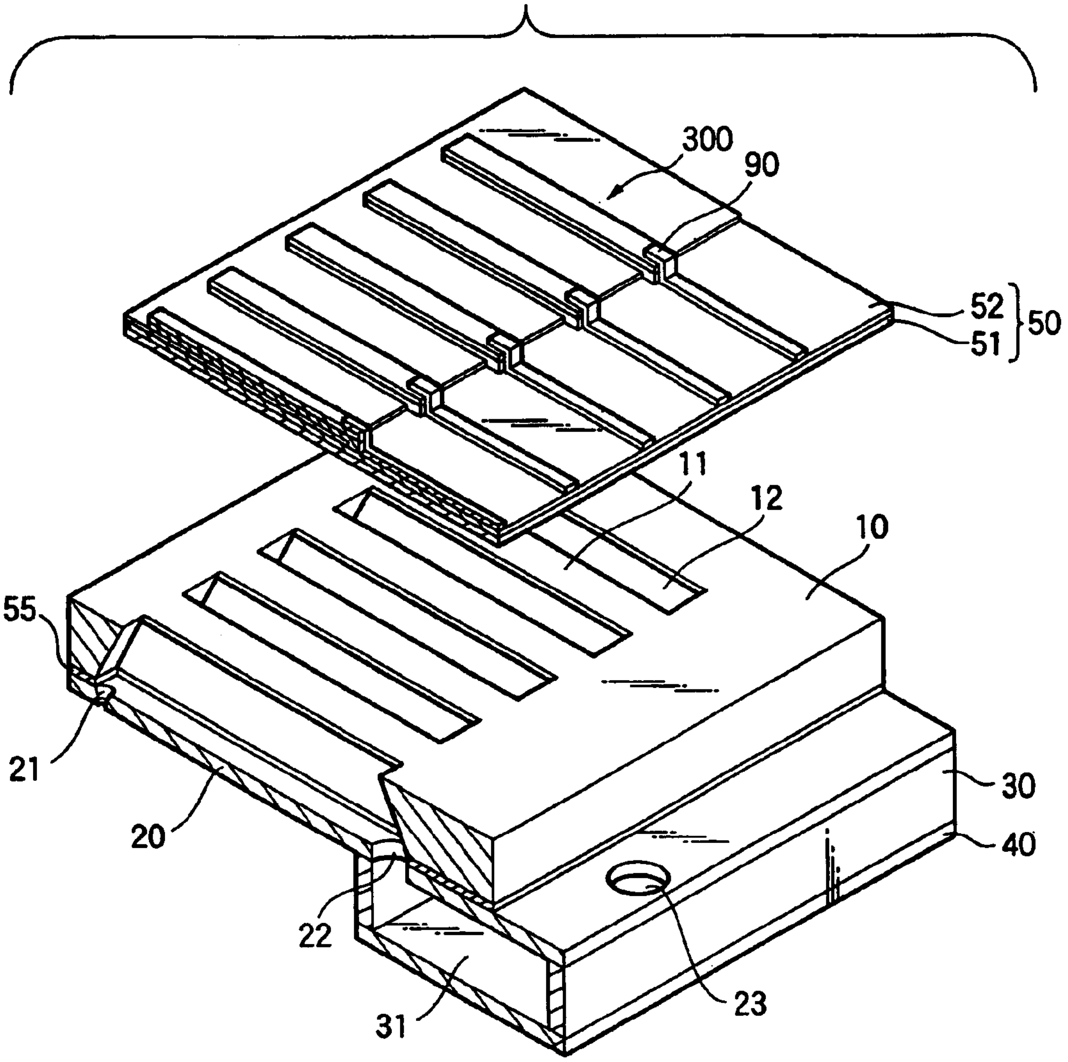
FIG. 1 is a perspective view showing an ink jet recording head according to an embodiment 1 of the present invention.
Figure 2A:
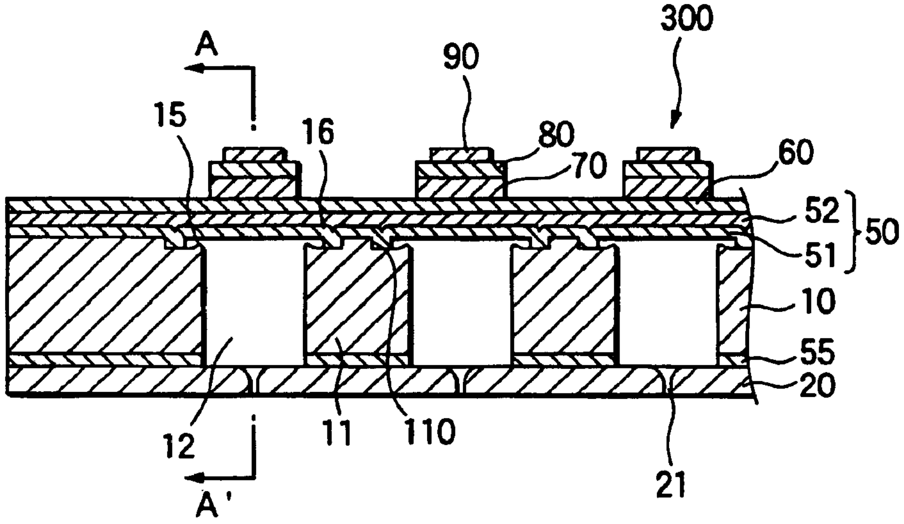
FIGS. 2A and 2B are cross sectional views showing the ink jet recording head according to the embodiment 1 of the invention.
Figure 2B:
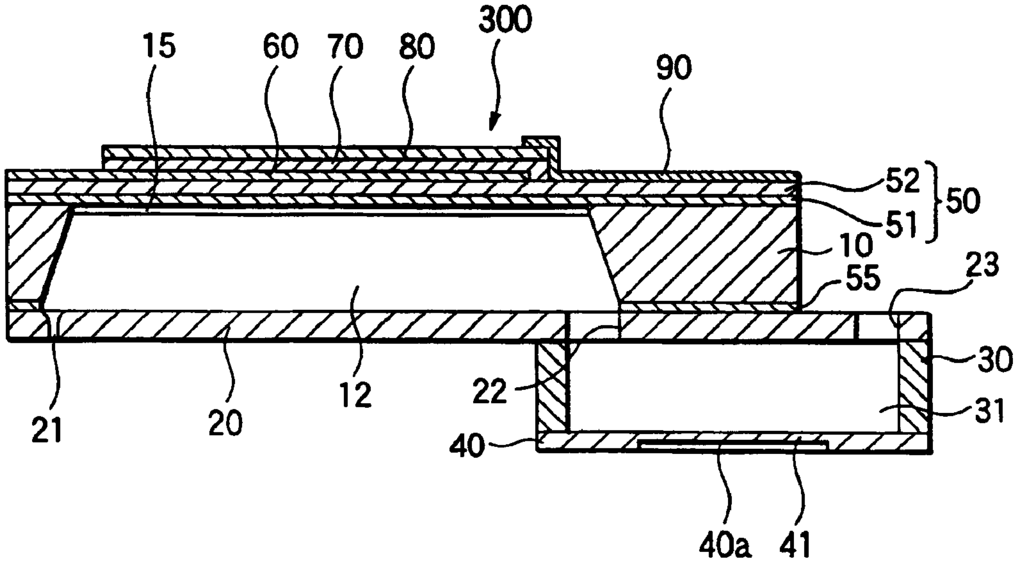

FIG. 1 is an exploded view showing an ink jet recording head according to an embodiment 1 of the present invention. FIG. 2A is a cross sectional view showing a pressure generating chamber, the illustration being viewed in a direction in which the pressure generating chambers are arranged side by side in the ink jet recording head. FIG. 2B is a cross sectional view showing taken on line A–A' in FIG. 2A.

As shown, a passage forming substrate 10 consists of a silicon monocrystalline substrate having a face (110) in the embodiment. One of the surfaces of the passage forming substrate 10 is an opened surface, and an elastic film 50 forming one of the surfaces of the pressure generating chamber 12 is formed on the other surface.

In the embodiment, the elastic film 50 is formed with a first elastic film 51 which is made of silicon dioxide ($SiO_2$) and formed on the passage forming substrate 10, and a second elastic film 52 which is zirconium dioxide ($ZrO_2$)

and formed on the first elastic film 51. It is not essential that the elastic film 50 is made up of a plurality of layers.

Pressure generating chambers 12, which are formed by an anisotropic etching process and partitioned by a plurality of partitioning walls 11, are arranged side by side in the widthwise direction. A wide portion 15 is formed, by an anisotropic dry etching process, on the elastic film 50 side of each pressure generating chamber 12. The wide portions, each extending in the widthwise direction of the pressure generating chamber 12, and are arranged in the longitudinal direction of the pressure generating chamber 12.

Grooves 16, while extending in the longitudinal direction of the pressure generating chamber 12, are each formed on both sides of each wide portion 15. An etching stop layer 110 is put in the groove 16. The side faces of each wide portion 15 are defined by the etching stop layers 110.

The pressure generating chambers 12 having the wide portions 15 are formed in the following manner. Part of the pressure generating chambers are formed by applying anisotropic wet etching to the passage forming substrate 10 from one of the surfaces of the passage forming substrate to a region thereof near the elastic film 50. Thereafter, anisotropic dry etching is applied thereto till the etching stop layers 110 are exposed.

The etching stop layers 110 are provided for restricting the spread of the etching in the width direction of the wide portions 15 of the pressure generating chambers 12 when the pressure generating chambers 12 are formed in the passage forming substrate 10 by anisotropic dry etching. The etching substantially stops when the etching of the passage forming substrate 10 progresses till the etching stop layer 110 is exposed. A material of the etching stop layer 110 may be any material if it has an insulating property and is not etched by the anisotropic dry etching. For example, in the embodiment, a part of the first elastic film 51 is used as the etching stop layer 110 in a manner that the first elastic film 51 made of silicon dioxide, provided on the passage forming substrate 10, is filled into the grooves 16.

Thus, the etching stop layer 110 is provided on the passage forming substrate 10, thereby restricting the width of each wide portions 15 of the pressure generating chambers 12. With this feature, even if a position of the elastic film 50 side of the pressure generating chamber 12 is made instable by the dispersion in verticality of the pressure generating chambers 12, a tolerance of a relative position shift of the piezoelectric element may be made large.

A protecting film 55 formed with a silicon dioxide layer is formed on the surface of the opened surface of the passage forming substrate 10, by thermally oxidizing the surface of the passage forming substrate 10. A nozzle plate 20 with nozzle orifices 21 formed therein is bonded onto the protecting film 55 with adhesive, a thermal deposition film or the like being interposed therebetween. The nozzle plate 20 has a thickness of 0.1 to 1 mm, and is made of glass, monocrystalline silicon, stainless steel (SUS) or the like, whose expansion coefficient is 2.5 to 4.5[$\times 10^{-6}$/° C.] at 3000° C. The nozzle plate 20 entirely covers one of the surfaces of the passage forming substrate 10, and also serves as a reinforcing plate for protecting the passage forming substrate 10 consisting of a silicon monocrystalline substrate against impact and external force applied thereto.

Additionally, the pressure generating chambers 12 is connected to a common ink chamber 31 via ink supply ports 22, which are formed at positions corresponding to the first ends of the pressure generating chambers 12 of the nozzle plate 20. Ink is supplied from the common ink chamber 31 to the pressure generating chambers 12, through the ink supply ports 22.

An ink introducing port 23 through which ink is supplied from exterior to the common ink chamber 31 is formed in a part protruded from an end of the passage forming substrate 10 of the nozzle plate 20.

An ink-chamber forming plate 30 and an ink chamber side plate 40, which cooperatively form the common ink chamber 31, are joined to a part of the nozzle plate 20 which contains the ink supply ports 22 and the ink introducing port 23.

The ink-chamber forming plate 30 forms the periphery wall of the common ink chamber 31, and is formed by punching a stainless plate having a thickness, which is appropriately determined depending on the number of nozzle orifices and the ink ejection frequency. In the embodiment, a thickness of the ink-chamber forming plate 30 is 0.2 mm.

The ink chamber side plate 40 is formed with a stainless plate, and one of its surfaces forms one side wall of the common ink chamber 31. The ink chamber side plate 40 is half-etched to form a recess 40*a* in a part of the other surface, whereby a thin wall 41 is formed. The thin wall 41 is provided for absorbing a pressure, which is generated at the time of ejecting the ink droplet and acts toward the side opposite to the nozzle orifices 21. And it prevents an unnecessary positive or negative pressure from acting on the other pressure generating chamber 12 by way of the common ink chamber 31.

The size of the pressure generating chamber 12 for applying the pressure to the ink for ejection and the size of the nozzle orifices 21 for ejecting ink droplets are optimized in accordance with the amount of ink droplet ejected, ejecting speed, and ejection frequency. In the recording of 360 ink droplets per inch, it is necessary to accurately form the nozzle orifices 21 each having a diameter of several tens $\mu$m.

A lower electrode film 60 of about 0.2 $\mu$m thick, a piezoelectric layer 70 of about 1 $\mu$m thick , and an upper electrode 80 of about 0.1 $\mu$m are laminated on the elastic film 50 of the passage forming substrate 10 by a process to be described later, whereby a piezoelectric element 300 is formed. Here, the piezoelectric element 300 indicates a portion including the lower electrode film 60, piezoelectric layer 70 and upper electrode 80. Generally, the piezoelectric element 300 is formed such that either of the electrodes is used as a common electrode, and the other electrode and the piezoelectric layer 70 are patterned every pressure generating chamber 12. In the specification, a portion which includes the electrode and piezoelectric layer 70 as patterned, and will be piezoelectrically distorted when voltage is applied to between both the electrodes, will be referred to as a piezoelectric-material active part. In the present embodiment, the lower electrode film 60 is used as a common electrode of the piezoelectric element 300, the upper electrodes 80 are individual electrodes of the piezoelectric element 300. However, the former may be used as the individual electrodes and the latter may be used as the common electrode at the convenience of designing the drive circuit and wiring require. If so done, no problem arises. In either case, the piezoelectric-material active part is formed every pressure generating chamber. In the specification, a combination of the piezoelectric element 300 and the vibration plate in which a displacement is caused wen the piezoelectric element 300 is driven, will referred to as a piezoelectric actuator. In the embodiment mentioned above, the elastic film 50 and the lower electrode film 60 serve as the vibration plate, and the lower electrode film may additionally have a function of the elastic film.

The upper electrodes 80 as the individual electrodes of the piezoelectric element 300 are connected to an external wiring through lead electrodes 90, which extend on the elastic film 50 from one end of the piezoelectric element 300 as viewed in the longitudinal direction.

The thus constructed ink jet recording head of the embodiment operates in the following way. Ink is introduced into the head through the ink introducing port 23 connecting to an external ink supplying device (not shown). After the ink flow structure ranging from the common ink chamber 31 to the nozzle orifices 21 is filled with the ink. Voltage is applied to between the lower electrode film 60 and the upper electrode 80 of each pressure generating chamber 12 in accordance with a recording signal derived from an external drive circuit (not shown). The elastic film 50, lower electrode film 60 and piezoelectric layer 70 are flexurally deformed. As a result, a pressure within each pressure generating chamber 12 increases, then an ink droplet is ejected from the nozzle orifice 21 associated therewith.

A method of manufacturing an ink jet recording head thus constructed will be described in detail. FIGS. 3 to 5 show, in cross sectional views in a direction in which pressure generating chambers are arranged side by side, the method of manufacturing the ink jet recording head.

Figure 3A:
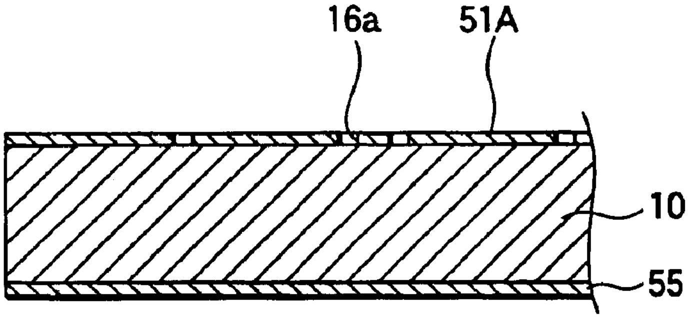
FIGS. 3A–3D are cross sectional views showing a method of manufacturing the ink jet recording head according to the embodiment 1 of the invention, the illustration being as viewed in a direction in which pressure generating chambers are arranged side by side.

As shown in FIG. 3A, a wafer of a silicon monocrystalline substrate, which will be a passage forming substrate 10, is thermally oxidized in a diffusion being set at about 1100° C. A mask 51A made of silicon oxide is formed on one of the surfaces of the passage forming substrate 10, and is patterned to form openings 16*a* therein. At the same time, a protecting film 55 made of silicon dioxide is formed on the other surface of the passage forming substrate.

Figure 3B:
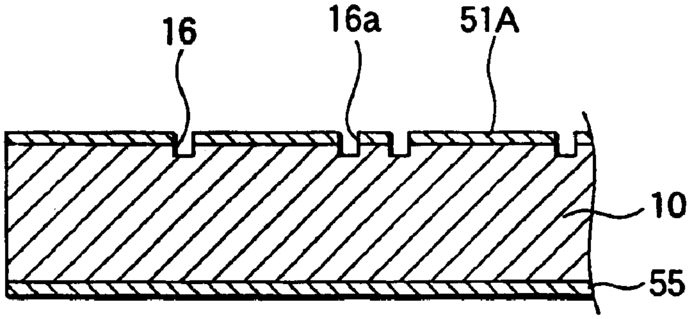

Subsequently, as shown in FIG. 3B, grooves 16 are formed in the passage forming substrate 10 by anisotropic etching, by using the mask 51A having he openings 16*a* formed therein as a mask pattern.

In this case, the anisotropic etching may be anisotropic wet etching or anisotropic dry etching, and the etching is not limited to the anisotropic etching.

Figure 3C:
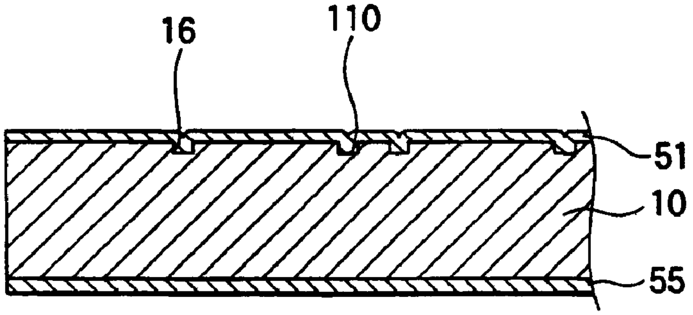

As shown in FIG. 3C, the passage forming substrate 10 is thermally oxidized again, and another first elastic film 51 made of silicon oxide is formed on the one surface of the passage forming substrate 10. At this time, the first elastic film 51 is formed entirely covering the inner surfaces of the grooves 16, so that etching stop layers 110 made of silicon oxide are formed in the grooves 16.

The first elastic film 51 is formed on the surface of the passage forming substrate 10, while being substantially uniform in thickness. To fill the first elastic film 51 in the grooves 16, it is preferable that the width of each groove 16 is selected to be smaller in value than a value which is two times as large as the thickness of the first elastic film 51. By so selected, the first elastic film 51 reliably fills the grooves 16.

In the embodiment, the first elastic film 51 and the protecting film 55 are formed by thermally oxidizing the passage forming substrate. Instead, it may be formed at a relatively low temperature, 350° C.~500° C., by a TEOS-CVD method. In the embodiment, the etching stop layers 110 are formed in the grooves 16 in a manner that the first elastic film 51 is formed covering the inner surfaces of the grooves 16. In an alternative, the etching stop layers are formed in the grooves 16 by a material other than the first elastic film 51, and then the first elastic film 51 is formed on the surface of the passage forming substrate 10 and the etching stop layers. The etching stop layers whose material is the same as that of the first elastic film 51 may be formed in a process step, which is different from the step of forming the first elastic film 51, as a matter of course.

Figure 3D:
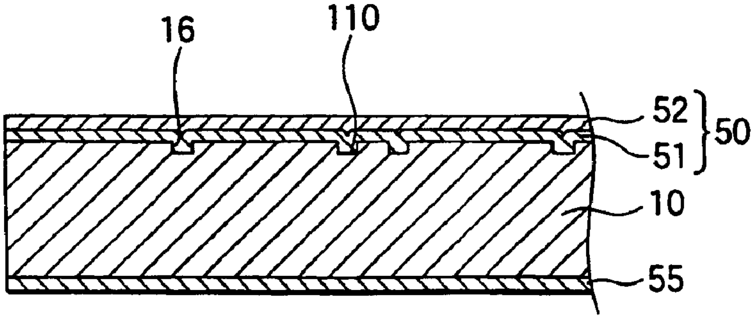

Next, as shown in FIG. 3D, a second elastic film 52 is formed over the first elastic film 51. In the present embodiment, a zirconium layer is formed on the first elastic film 51, and is thermally oxidized in a diffusion being set at 500~1200° C., thereby forming a second elastic film 52 of zirconium dioxide. And the first elastic film 51 and the second elastic film 52 cooperate to form an elastic film 50.

In the embodiment, the first elastic film 51 fills the grooves 16 such that it reaches the surface of the passage forming substrate 10 by using part of the first elastic film 51 for the etching stop layers 110. Accordingly, the surface of the second elastic film 52 is substantially flat.

Figure 4A:
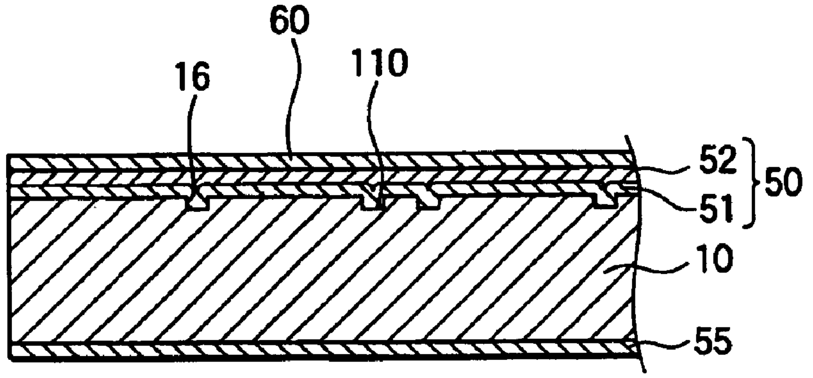
FIGS. 4A–4C are cross sectional views showing a method of manufacturing the ink jet recording head according to the embodiment 1 of the invention, the illustration being as viewed in a direction in which pressure generating chambers are arranged side by side.

Subsequently, as shown in FIG. 4A, a lower electrode film 60 is entirely formed on the elastic film 50 side of the passage forming substrate 10 by sputtering and is patterned into a predetermined shape. Platinum, iridium or the like is preferable as a material of the lower electrode film 60. The reason for this is that a piezoelectric layer 70, which will be described later and formed by a sputtering method or sol-gel method must be baked and crystallized at about 600 to 1000° C. in an air or oxygen atmosphere after the film formation. A material of the lower electrode film 60 must maintain its conductivity at such a high temperature and oxidizing atmosphere. In particular, in a case where lead zirconium titanate (PZT) is used for the piezoelectric layer 70, it is preferable that the conductivity of the lower electrode film material is less varied by diffusion of the lead oxide. For those reasons, platinum or iridium is preferable for the lower electrode film material.

Figure 4B:
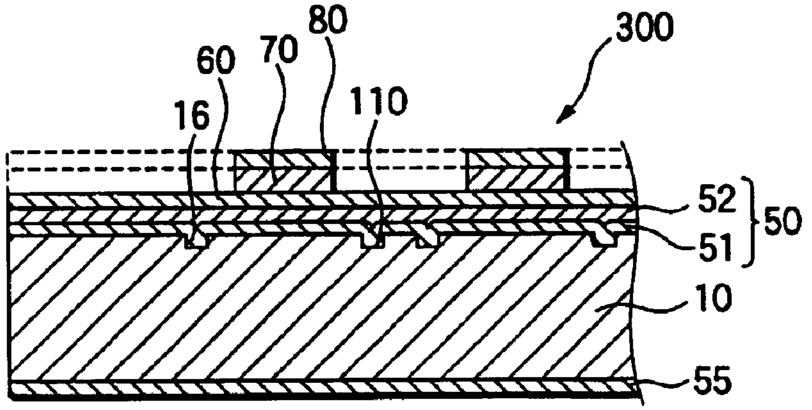

Subsequently, as shown in FIG. 4B, a piezoelectric layer 70 and an upper electrode film 80 are formed, and a piezoelectric element 300 is patterned by etching only of the piezoelectric layer 70 and the upper electrode film 80.

In the embodiment, the piezoelectric layer 70 is formed by called sol-gel process, viz., in a manner that a sol which is formed by dissolving and dispersing metal organic into a catalyst is coated and dried into a gel, and the gel is baked at high temperature, whereby a piezoelectric layer 70 made of metal oxide is formed. PZT-based materials are preferable for the material of the piezoelectric layer 70 which it is used for an ink jet recording head. A film formation method is not limited for forming the piezoelectric layer 70. Spin coating process such as sputtering method or metal organic deposition process (MOD) may be employed.

The following method may be employed. In the method, a percursor film of lead zirconium titanate is formed by a sol-gel process, sputtering or MOD process, and then is crystallized at low temperature by high pressure process in an alkaline solution.

High electrical conductivity materials such as aluminum, gold, nickel, platinum, or other metals and a conductive oxide may be used as a material of the upper electrode film 80. In the embodiment, platinum is used for film formation by sputtering.

Figure 4C:
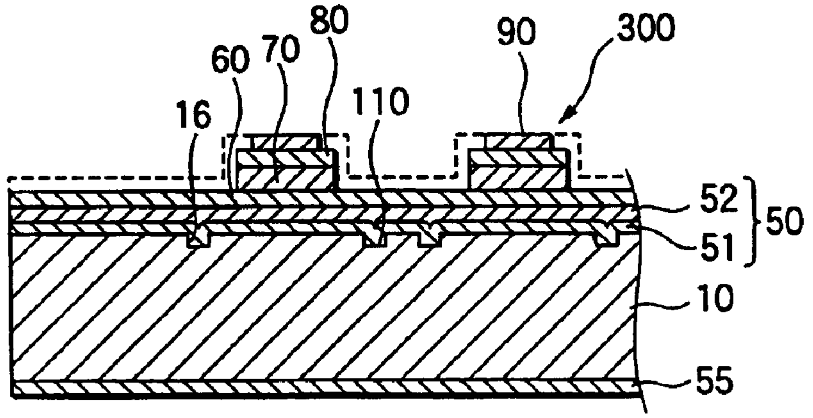

Next, lead electrodes 90 are formed entirely on the passage forming substrate 10 and patterned every piezoelectric element 300, as shown in FIG. 4C.

The film formation process is as mentioned above. Following the film formation, pressure generating chambers 12 are formed by anisotropic etching process.

Figure 5A:
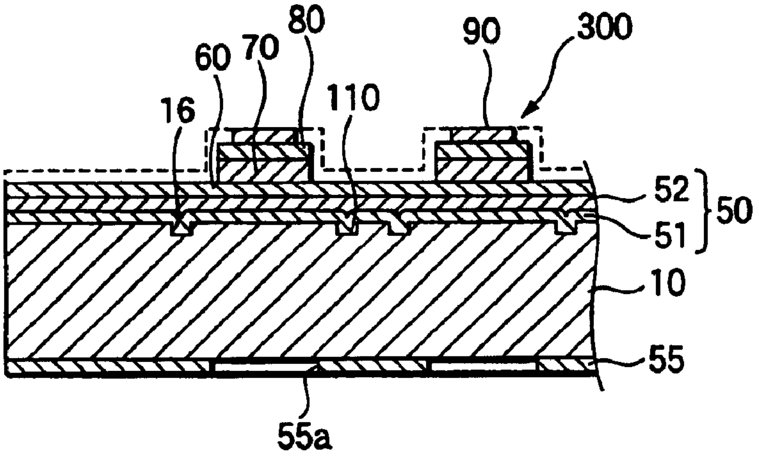
FIGS. 5A–5C are cross sectional views showing a method of manufacturing the ink jet recording head according to the embodiment 1 of the invention, the illustration being as viewed in a direction in which pressure generating chambers are arranged side by side.

As shown in FIG. 5A, openings 55*a* are formed in a region of a protecting film 55 which is formed on the side of the passage forming substrate 10 opposite to the side thereof by patterning the region of the protecting film in which pressure generating chambers 12 are to be formed.

Figure 5B:
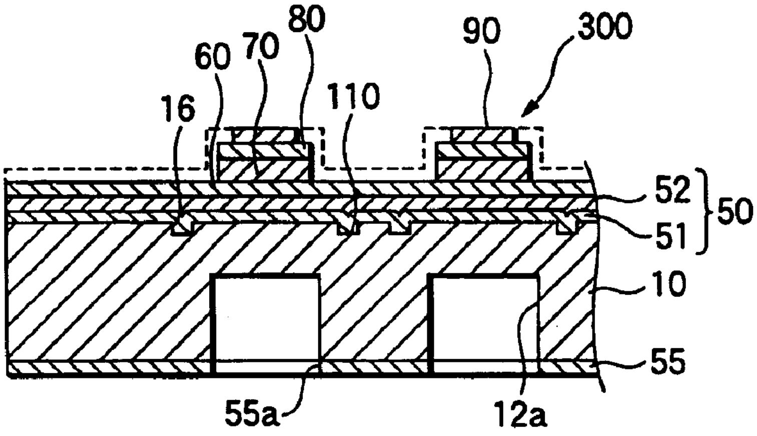

Subsequently, as shown in FIG. 5B, recesses 12*a* which will be parts of the pressure generating chambers 12 are formed by anisotropic wet etching process by use of the protecting film 55 having openings 55*a* as a mask pattern.

Where the anisotropic wet etching is used, recesses 12*a* may be formed to have a predetermined depth without forming through holes in the passage forming substrate 10 by etching, if the half etching is used. Accordingly, there is no case that an alkaline aqueous solution used in the anisotropic wet etching or etching reaction products penetrate through the elastic film 50 to damage the piezoelectric elements 30.

Figure 5C:
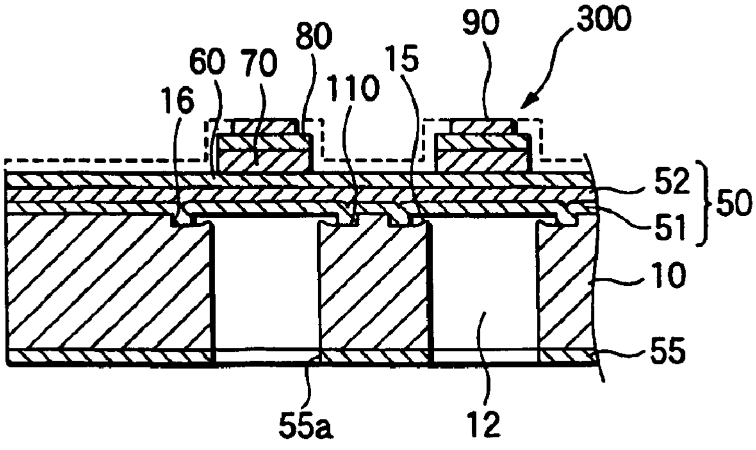

Then, as shown in FIG. 5C, the recesses 12*a* as formed by anisotropic wet etching are continuously subjected to anisotropic dry etching process, to thereby form pressure generating chambers 12.

In the anisotropic dry etching process, the etching is continued till the etching reaches the first elastic film 51. In the anisotropic dry etching process, the etching indefinitely ends, so that the pressure generating chambers 12 spread in width along the first elastic film 51 to form wide portions 15. At the time, the etching substantially stops in the width direction at a time point where the etching stop layers 110 formed in the grooves 16 are exposed. As a result, the wide portions 15 are formed on the elastic film 50 side of each pressure generating chamber 12 in a state that it extends in the widthwise direction of the pressure generating chamber 12 and has predetermined width.

It is satisfactory that the depth of each groove 16 is selected to be such a depth value, i.e., about 0.5 $\mu$m or larger, as to prevent that when the pressure generating chambers are formed by the anisotropic dry etching process, the wide portions 15 formed on the elastic film 50 side exceed each beyond the etching stop layer 110 formed in the groove 16 and spread.

With this feature, even if a position of the vibration plate side of the pressure generating chamber 12 is made instable by the dispersion in verticality of the pressure generating chambers, a tolerance of a relative position shift between the piezoelectric element 300 and the pressure generating chambers 12 may be made large by providing the etching stop layers 110 to restrict the width of the wide portions 15 of the pressure generating chambers 12.

Thus, in the embodiment, the first elastic film 51 fills the grooves 16 such that it reaches the surface of the passage forming substrate 10 by using the etching stop layer 110 made of the same material as of the first elastic film 51, i.e., a part of the first elastic film 51, and the surface of the second elastic film 52 is substantially flat. With this feature, there is eliminated the stress concentration by deformation of the piezoelectric element 300, and hence the elastic film 50 is prevented from being broken.

The elastic film 50 side of the pressure generating chamber 12 is formed by the anisotropic dry etching process, and the opening side of the pressure generating chambers is formed by the anisotropic wet etching process. Accordingly, the piezoelectric element 300 is reliably prevented from being damaged. It is satisfactory that at least the elastic film 50 side of the pressure generating chambers 12 are formed by the anisotropic dry etching process. Accordingly, the pressure generating chambers 12 may be formed by the anisotropic dry etching process.

In this way, a number of chips are simultaneously formed on a single wafer by the sequential film forming steps and the anisotropic etching processes, and after the process ends, the wafer is divided into passage forming substrates 10 each of one chip size as shown in FIG. 1. Then, a nozzle plate 20, an ink-chamber forming plate 30 and an ink chamber side plate 40 are successively bonded to each of those passage forming substrates 10, whereby a unit body or an ink jet recording head is formed.

Another Embodiment

While the ink jet recording head and the method of manufacturing the same, which are believed to be the preferred embodiments of the invention, have been described, it should be understood that the invention is not limited to such.

Figure 6:
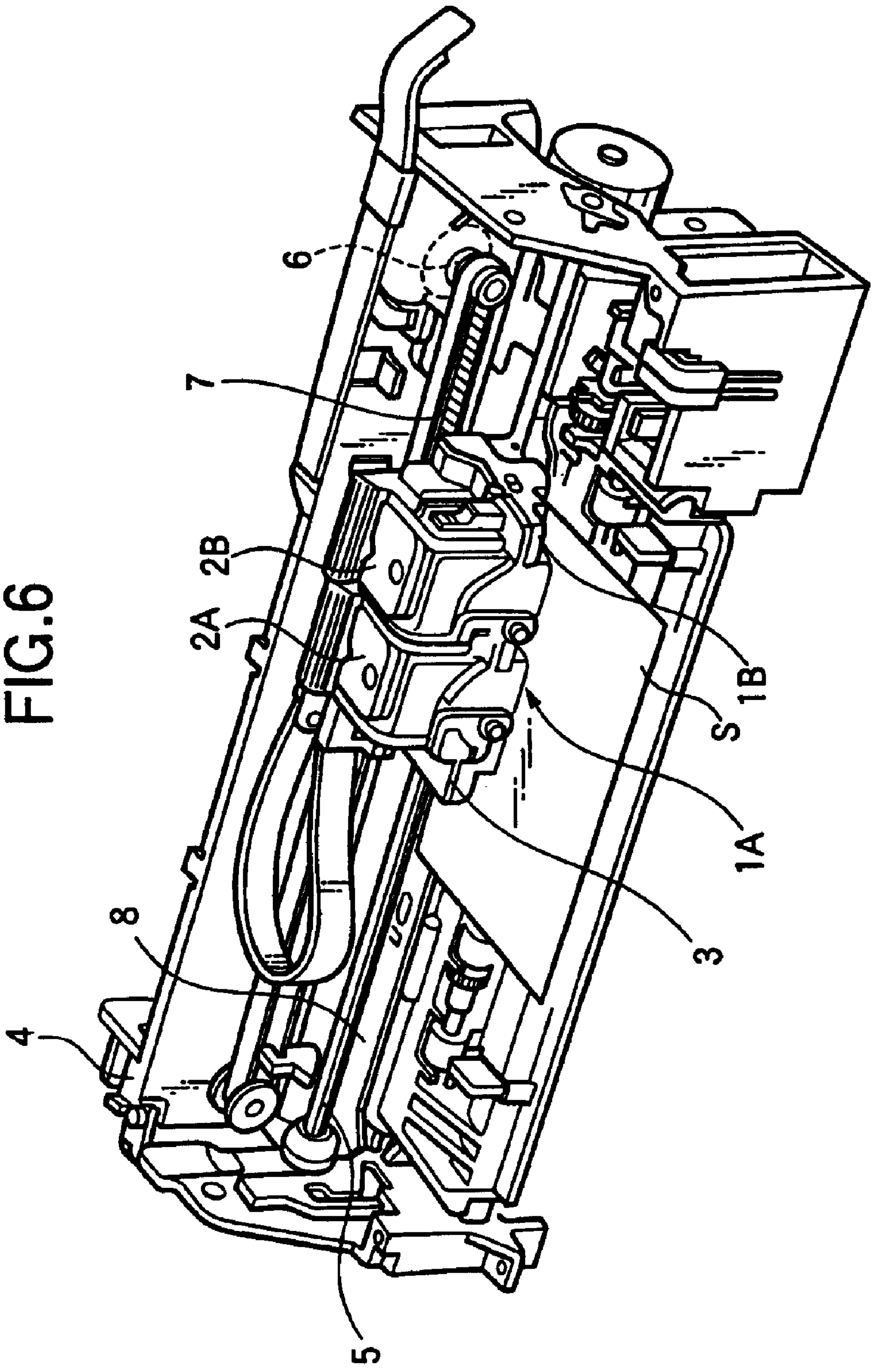
FIG. 6 is a perspective view showing the ink jet recording head according to the embodiment of the invention.

The ink jet recording head of the embodiment 1 forms a part of a recording head unit provided with ink passages communicating with the ink cartridges or the like, and is mounted on an ink jet recording apparatus. FIG. 6 shows an example of the ink jet recording head.

As shown in FIG. 6, ink cartridges 2A and 2B, which form an ink supplying device, are detachably mounted on recording head units 1A and 1B provided with recording heads, respectively. A carriage 3 on which the recording head units 1A and 1B are mounted is axially movable along a carriage shaft 5 mounted on an apparatus body 4. The recording head units 1A and 1B eject a black ink composition and color ink compositions, respectively.

A driving force by a drive motor 6 is transmitted to the carriage 3 by a way of a plurality of gears (not shown) and a timing belt 7, so that the carriage 3 having the recording head units 1A and 1B mounted thereon is moved along the carriage shaft 5. The head body 4 includes a platen 8 extending along the carriage 3. The platen 8 is driven to rotate by a driving force of a paper feed motor (not shown). In this case, a recording sheet S as a recording medium of paper, which is fed by the feeding roller or the like, is wound on the platen 8, and transported.

As seen from the foregoing description, wide portions are provided on the vibration plate side of the pressure generating chambers, and the etching stop layers for restricting the spread of the etching in the width direction of the wide portions, are formed in the passage forming substrate. With such a technical feature, the width of the wide portions of the vibration plate side of the pressure generating chambers are restricted by the etching stop layers. As a result, the pressure generating chambers are manufactured highly accurately, and the ink ejecting characteristic and stability are improved. In such a method of manufacturing pressure generating chambers, at least the vibration plate side of the pressure generating chambers are formed by the anisotropic dry etching process. Accordingly, the piezoelectric elements are not damaged, and hence piezoelectric elements improved in reliability may be manufactured.

What is claimed is:

1. A method of manufacturing an ink jet recording head including a passage forming substrate made of a silicon monocrystalline substrate having a pressure generating chamber communicating with a nozzle orifice, a vibration plate provided on a surface of the passage forming substrate, a piezoelectric element provided on the vibration plate having a lower electrode film, a piezoelectric layer and an upper electrode, which are formed by film forming and lithography processes, the method comprising:

forming a groove on both sides of a region in one surface of the passage forming substrate where the pressure generating chamber is to be formed, the grooves extending in the longitudinal direction;

forming an etching stop layer in the groove for restricting etching of the passage forming substrate;

forming the piezoelectric element by successively laminating the lower electrode, the piezoelectric layer and the upper electrode on the surface of the passage forming substrate through a vibration plate interposed therebetween; and forming the pressure generating chamber by etching out the side of the vibration plate in the passage forming substrate by an etching process so that the etching stop layer is exposed.

2. The ink jet recording head manufacturing method according to claim 1, wherein the etching stop layer has each an insulating property.

3. The ink jet recording head manufacturing method according to claim 1, wherein the etching stop layer is made of silicon oxide.

4. The ink jet recording head manufacturing method according to claim 1, wherein a side face of the etching stop layer is formed by the groove.

5. A method of manufacturing an ink jet recording head including a passage forming substrate made of a silicon monocrystalline substrate having a pressure generating chamber communicating with a nozzle orifice, a vibration plate provided on a surface of the passage forming substrate, a piezoelectric element provided on the vibration plate having a lower electrode film, a piezoelectric layer and an upper electrode, which are formed by film forming and lithography processes, the method comprising:

forming a groove on both sides of a region in one surface of the passage forming substrate where the pressure generating chamber is to be formed, the grooves extending in the longitudinal direction;

forming an etching stop layer in the groove for restricting etching of the passage forming substrate;

forming the piezoelectric element by successively laminating the lower electrode, the piezoelectric layer and the upper electrode on the surface of the passage forming substrate through a vibration plate interposed therebetween; and forming the pressure generating chamber by etching out the side of the vibration plate in the passage forming substrate by an etching process so that the etching stop layer is exposed;

wherein in forming the pressure generating chamber, the passage forming substrate is subjected to anisotropic wet etching, and then anisotropic dry etching, thereby forming the pressure generating chamber.

6. A method of manufacturing an ink jet recording head including a passage forming substrate made of a silicon monocrystalline substrate having a pressure generating chamber communicating with a nozzle orifice, a vibration plate provided on a surface of the passage forming substrate, a piezoelectric element provided on the vibration plate having a lower electrode film, a piezoelectric layer and an upper electrode, which are formed by film forming and lithography processes, the method comprising:

forming a groove on both sides of a region in one surface of the passage forming substrate where the pressure generating chamber is to be formed, the grooves extending in the longitudinal direction;

forming an etching stop layer in the groove for restricting etching of the passage forming substrate;

forming the piezoelectric element by successively laminating the lower electrode, the piezoelectric layer and the upper electrode on the surface of the passage forming substrate through a vibration plate interposed therebetween; and forming the pressure generating chamber by etching out the side of the vibration plate in the passage forming substrate by an etching process so that the etching stop layer is exposed;

wherein the etching stop layer is made of the same material as a part of the vibration plate.

7. A method of manufacturing an ink jet recording head including a passage forming substrate made of a silicon monocrystalline substrate having a pressure generating chamber communicating with a nozzle orifice, a vibration plate provided on a surface of the passage forming substrate, a piezoelectric element provided on the vibration plate having a lower electrode film, a piezoelectric layer and an upper electrode, which are formed by film forming and lithography processes, the method comprising:

forming a groove on both sides of a region in one surface of the passage forming substrate where the pressure generating chamber is to be formed, the grooves extending in the longitudinal direction;

forming an etching stop layer in the groove for restricting etching of the passage forming substrate;

forming the piezoelectric element by successively laminating the lower electrode, the piezoelectric layer and the upper electrode on the surface of the passage forming substrate through a vibration plate interposed therebetween; and forming the pressure generating chamber by etching out the side of the vibration plate in the passage forming substrate by an etching process so that the etching stop layer is exposed;

wherein in forming the groove, the width of the groove is selected to be a smaller value than a value two times as large as the thickness of the etching stop layer.

8. A method of manufacturing an ink jet recording head including a passage forming substrate made of a silicon monocrystalline substrate having a pressure generating chamber communicating with a nozzle orifice, a vibration plate provided on a surface of the passage forming substrate, a piezoelectric element provided on the vibration plate having a lower electrode film, a piezoelectric layer and an upper electrode, which are formed by film forming and lithography processes, the method comprising:

forming a groove on both sides of a region in one surface of the passage forming substrate where the pressure generating chamber is to be formed, the grooves extending in the longitudinal direction;

forming an etching stop layer in the groove for restricting etching of the passage forming substrate;

forming the piezoelectric element by successively laminating the lower electrode, the piezoelectric layer and the upper electrode on the surface of the passage forming substrate through a vibration plate interposed therebetween; and forming the pressure generating chamber by etching out the side of the vibration plate in the passage forming substrate by an etching process so that the etching stop layer is exposed;

wherein the etching process is an anisotropic dry etching process.

* * * * *